United States Patent [19]
Jones et al.

[11] 3,965,030
[45] June 22, 1976

[54] LYOTROPIC NEMATIC LIQUID CRYSTALS FOR USE IN ELECTRO-OPTICAL DISPLAY DEVICES

[75] Inventors: Derick Jones; Sun Lu, both of Dallas, Tex.

[73] Assignee: Texas Instruments Incorporated, Dallas, Tex.

[22] Filed: Aug. 7, 1972

[21] Appl. No.: 278,302

Related U.S. Application Data

[62] Division of Ser. No. 16,078, March 3, 1970, Pat. No. 3,690,745.

[52] U.S. Cl. .............................. 252/299; 23/230 LC; 252/408; 350/160 LC
[51] Int. Cl.² ........................................ C09K 3/34
[58] Field of Search .............. 252/408, 299, 408 LC; 23/230 LC; 350/160 LC; 260/566 R, 479 R

[56] References Cited
UNITED STATES PATENTS

| | | | |
|---|---|---|---|
| 3,499,702 | 3/1970 | Goldmacher et al. | 350/160 LC |
| 3,540,796 | 11/1970 | Goldmacher et al. | 252/408 |
| 3,675,987 | 7/1972 | Rafuse | 252/408 |
| 3,738,942 | 6/1973 | Matsumoto et al. | 252/408 |

Primary Examiner—Mayer Weinblatt
Assistant Examiner—John D. Smith
Attorney, Agent, or Firm—Harold Levine; James T. Comfort; William E. Hiller

[57] ABSTRACT

A display device in which a thin layer of a lyotropic nematic mesomorphic composition is utilized to diffuse light from a source toward an observer by applying a suitable voltage, for example, 20 volts for one mil layer. One form of the device transmits light through the layer. A second form of the device uses light diffused and reflected to the observer. A preferred lyotropic nematic mesomorphic composition includes three compounds of the structural formulae:

(1)

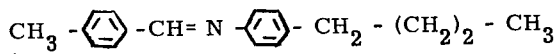

(2)

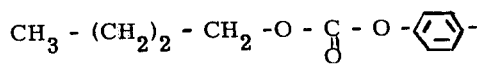

and (3)

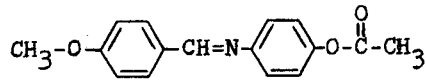

5 Claims, 3 Drawing Figures

LYOTROPIC NEMATIC LIQUID CRYSTALS FOR USE IN ELECTRO-OPTICAL DISPLAY DEVICES

This is division of application Ser. No. 016,078, filed Mar. 3, 1970, now U.S. Pat. No. 3,690,745.

This invention relates to display devices and more particularly to electro-optical display devices utilizing a thin layer of a lyotropic nematic mesomorphic composition for diffusing light from a source.

All matter is commonly classifed in one of three states: solid, liquid and gas. When these divisions of matter are refined it is found that certain compositions have transition properties which are not properly classifiable in any of the foregoing broad classes. The isotropic liquid is generally the state referred to when the term liquid is used. The majority of organic and inorganic compounds will transform from a solid, or a crystalline solid, to the isotropic liquid state upon reaching a particular temperature peculiar to a given solid. There are some compounds and mixtures of compounds, however, which pass through an intermediate state between the crystalline solid and the isotropic liquid. Some years ago it was found that certain compounds exhibited what became to be called mesophase intermediate its transition from the crystalline solid to the isotropic liquid. Within this mesophase there are a number of distinguishable subphases. These are known as the smectic mesophase, the nematic mesophase and the cholesteric mesophase. The smectic mesophase is a turbid viscous state which has certain properties similar to those found in soaps. The nematic mesophase is a turbid state, but is also a mobile state. The nematic mesophase frequently appears to be "threaded" when viewed between crossed polaroids. The cholesteric mesophase is a turbid and mobile phase which exhibits optical characteristics quite different from those of the smectic and nematic mesophases.

The majority of compositions exhibiting a mesomorphic phase are thermotropic. In other words, the mesophase is exhibited when a suitable compound is heated to a temperature above that at which its crystal lattice is stable, i.e., above its initial melting temperature. For example, if a crystalline solid compound which is both smectogenic and nematogenic is heated, the compound will change from the crystalline state to the smectic mesophase at a first given temperature. At a second higher temperature the compound will suddenly change states, giving rise to the nematic mesophase. At still a third temperature, the nematic mesophase of the composition will yield suddenly to give the isotropic liquid. These transition temperatures are reversible, but upon reversal are sometimes accompanied by supercooling. Compositions can exhibit one or more of the smectic, nematic and cholesteric mesophases.

A second type of mesomorphism to be distinguished from thermotropic mesomorphism, is lyotropic mesomorphism. Lyotropic mesomorphism is exhibited when certain solvents are added to certain other compositions. As the solvent is added intermediate states arise which exhibit mesomorphic properties. An excess of solvent will cause the lyotropic mesophase to pass over to a true solution. Lyotropic mesomorphic compounds also exhibit smectic and nematic properties. A number of known compositions will exhibit the lyotropic mesophase using water or other compounds as a solvent. For further discussion of the mesomorphic state, including the smectic, nematic and cholesteric mesophases and the distinction between the lyotropic mesophase and the thermotropic mesophase, refer to G. W. Gray, *Molecular Structure and the Properties of Liquid Crystals*, Academic Press, Inc., New York, 1962. For purposes of cross reference, the mesophases are commonly referred to as liquid crystals or as exhibiting liquid crystallinity.

It has also been known that when an electric potential is applied across a layer of a thermotropic nematic liquid crystal, turbulence is created in the molecular structure of the material. This is especially true in the nematic mesophase. One of the more recent disclosures of the optical properties of mesomorphic compounds is contained in U.S. Pat. No. 3,322,485. The patent discloses the use of organic thermotropic nematic compounds for use in electro-optical display devices. The display device utilizes the light scattering effect of an organic thermotropic nematic compound which has a voltage impressed through or across a layer thereof. Several limitations however are noted in the patent disclosure. The patent states that only a very thin layer of the mesomorphic compound can be utilized. In addition, the patent states that the optical scattering effect can only be observed when the mesomorphic layer is both nematic and thermotropic and is less than ½ millimeter in thickness. In addition, it should be noted that within the disclosure of the aforementioned patent no organic nematic thermotropic compound is disclosed which has or exhibits a mesophase below the temperature of 45° C. Thus, it is difficult to use the optical device disclosed in the aforementioned patent since normal room temperature is well below the lower limits of 45° C.

It is therefore desirable to develop and possess a nematic mesomorphic composition which can be utilized as an electro-optical display screen operable at temperatures normally encountered in habitable structures, i.e., temperatures near 25° C. It is furthermore desirable to possess a compound which will scatter light without maintaining an exact elevated temperature environment around the compound. This invention therefore provides an electro-optical display device including a first optically transmissive substrate and a first optically transmissive and electrically conductive coating on a face of the first substrate, a second substrate and an electrically conductive coating on a face of the second substrate, the substrates positioned such that the coatings are adjacent and substantially equidistantly spaced, and a light source means positioned to direct light toward the substrates, and means for impressing a voltage gradient between the coatings, the improvement comprising a lyotropic nematic mesomorphic composition occupying the space between the coatings, the composition having a threshold electrical field which when exceeded will cause it to scatter light. The lyotropic nematic mesomorphic composition is preferably organic and is preferably nematogenic at room temperature. The invention also provides a method for displaying light from a light source comprising the steps of directing a light beam at an angle toward a thin layer of a lyotropic nematic mesomorphic composition, and impressing a threshold voltage across the thin layer sufficient to cause the composition to scatter light.

A better understanding of the invention can be obtained by reference to the following specification wherein preferred embodiments of the invention are disclosed in conjunction with the appended drawings wherein.

Figure 1:
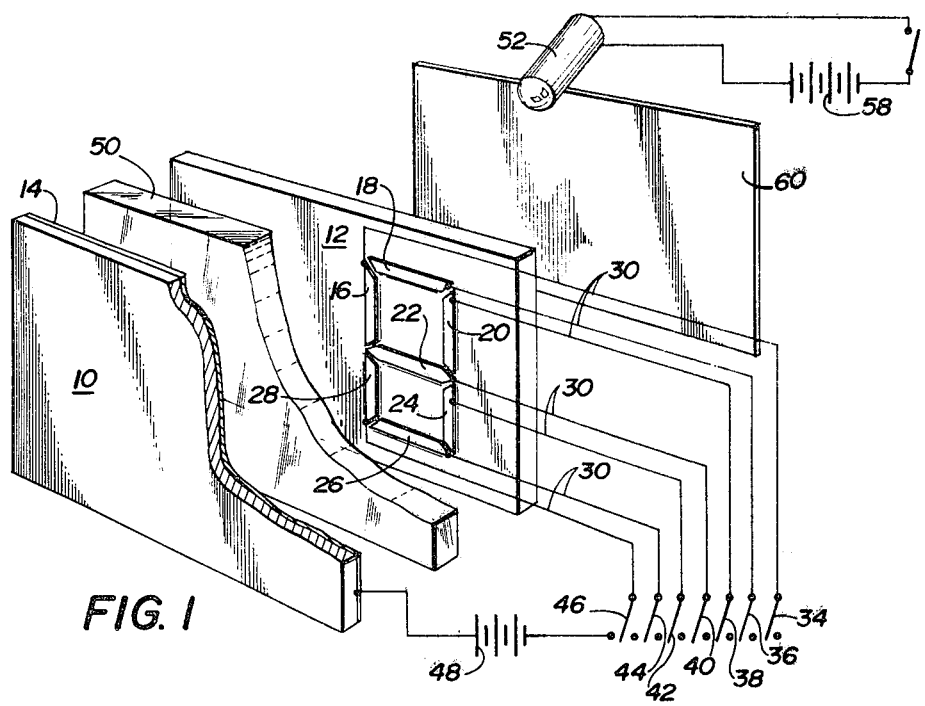
FIG. 1 is an exploded schematic view of a display device utilizing the composition of the present invention.

Referring to FIG. 1, two substrates 10 and 12 are positioned substantially parallel to each other. Substrate 10, shown partially broken away, is optically transmissive and has deposited thereon a coating 14 of a material which is optically transmissive and electrically conductive. Optically transmissive substrate 12 has coated thereon a plurality of electrically isolated electrodes 16, 18, 20, 22, 24, 26 and 28. These electrodes are also optically transmissive and electrically conductive. Each of the electrodes 16 through 28 has attached thereto a lead 30 which is optically transmissive and which has been electrically insulated by an optically transmissive insulating composition. Each of the leads 30 is attached at the edge of substrate 12 to conventional electrical leads which in turn are connected to switches 34 through 46 which correspond respectively to electrodes 16 through 28. Switches 34 through 46 are connected in parallel to a source 48 of electrical energy which is connected in series to electrically conductive coating 14. Interposed between substrates 10 and 12 is a thin layer 50 of a lyotropic nematic mesomorphic composition. For purposes of clarity in the exploded view of FIG. 1, the thin layer 50 is shown separated from the substrates 10 and 12; however, in operation, the thin layer 50 is intimately contacting the coating 14 and the electrodes 16 through 28. The layer 50 also, of course, contacts that portion of substrate 12 not containing an electrode. Positioned behind substrate 12 is a light source 52 which directs a light beam at an angle toward the rear face of substrate 12. Since both of the substrates and the electrode coatings thereon are optically transmissive, the light beam will normally pass through the display screen composed of the substrates 10 and 12, coating 14 and electrodes 16 through 28. The source of light 52 can be any conventional source including an incandescent source. The light beam is electrically connected to a suitable source 58 of electrical energy. Positioned behind and spaced from the substrate 12 is a nonreflective light absorbing substrate 60 perferably a dull black in color.

Figure 2:
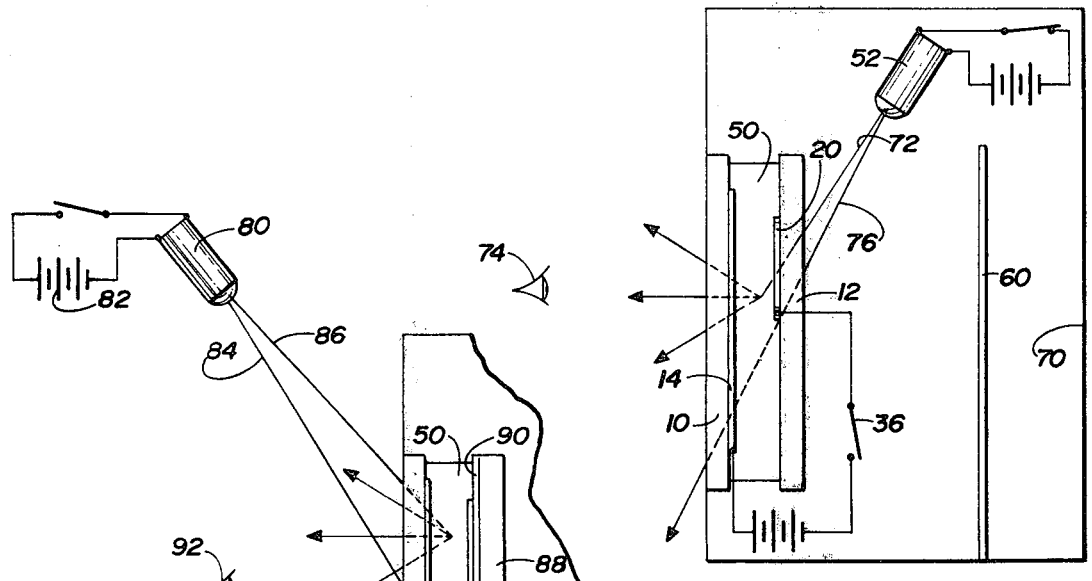
FIG. 2 is a side view of a device similar to that shown in FIG. 1.

Referring now to FIG. 2 which a side view of the apparatus shown in FIG. 1, operation of the display device will be described. FIG. 2 differs from FIG. 1 in that only one electrode 20 of electrodes 16 through 28 is illustrated. The display device is shown enclosed in casing 70. Like numerals are used where applicable. As can be seen, the thin layer 50 of a lyotropic nematic mesomorphic composition contacts the electrically conductive coating 14 and electrode 20. When switch 36 is closed a voltage gradient is impressed through the layer 50 between electrode 20 and that portion of coating 14 corresponding thereto. This will cause the portion of layer 50 through which the voltage gradient is impressed to diffuse light coming from light source 52. For purposes of illustration, light beam 72 is shown being diffused toward the eye 74 of an observer. A second light beam 76 which passes through the portion of the lyotropic nematic mesomorphic composition across which no voltage gradient is impressed without being diffused. Thus the observer is unable to see light from the light source in that portion of the layer. As will be surmised, substrate 60 is provided to eliminate internal reflections from light source 52 and also to eliminate stray room light which might interfere with the display characteristics of the display screen. Referring back to FIG. 1 it will be seen that if switches 34 and 46 are energized, a voltage gradient will be impressed across layer 50 through that portion of the layer corresponding to electrodes 16 and 28. An observer, such as observer 74 of FIG. 2, will see a numeral one displayed. Similarly, if all of switches 34 through 46 are closed the observer will see the numeral eight displayed.

Figure 3:
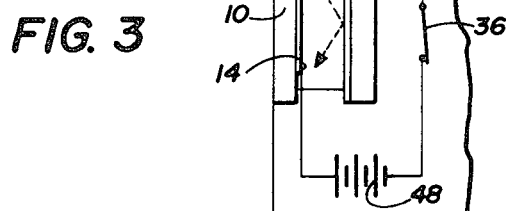
FIG. 3 is a side view of another embodiment of the display device of the present invention.

In FIG. 3 a different embodiment of the present invention is illustrated. In this embodiment optically transmissive substrate 10 and optically transmissive and electrically conductive coating 14 are constructed the same as above. A light source 80, connected to a suitable electrical energy source 82, is positioned exterior of the casing 70 to direct light beams 84 and 86 toward the lyotropic nematic mesomorphic layer 50. In this embodiment substrate 88 need not be optically transmissive. Contacting substrate 88 is a reflective coating 90 onto which an electrode 20 is placed. Similar to the foregoing embodiment, the electrode 20 is electrically connected through switch 36 and energy source 48 to coating 14. In this embodiment, light from source 80, for example light beam 86, strikes the lyotropic nematic mesomorphic layer 50 through which a voltage is impressed, is diffused, and is reflected back toward observer 92 by reflective coating 90. However, light beam 84 not traversing a portion of the layer 50 across which an electrical field is being impressed is reflected by coating 90 away from observer 92. Thus, as above, the observer 92 will see a display corresponding only to the size and shape of electrode 20. Light source 80, of course, need not be an artificial source such as shown but can be any available source including sunlight.

The electrical energy or impressed voltage across the layer 50 must be sufficiently large to reach or exceed the threshold voltage at which the lyotropic nematic mesomorphic composition will scatter light. It has been found that for layers having a thickness of one mil the threshold voltage for most compositions occurs at around 8 volts, while best results are obtained with a voltage on the order of 20 volts. For best results it has been found that the layer should be relatively thin, preferably less than 20 mils thick with a layer less than 4 mils giving most preferred and optimum results. The substrates 10 and 12 can be composed of any suitable material which is optically transmissive, for example, various types of glass, fused quartz, transparent varieties of corundum and transparent plastics or resins. The term optically transmissive as used herein includes both transparent and translucent materials. The coating and electrodes which are both electrically conductive and optically transmissive, such as coatings 14 and electrodes 16 through 28, can be composed of layers of indium oxide or tin oxide deposited on the surface of the respective substrates. If a reflective surface is desired, a thin layer of a metallic material such as silver or aluminum can be deposited on a substrate such as coating 90 on substrate 88. It is to be understood, of course, with reference to FIG. 3 that the reflective coating 90 can be placed either at the front or rear of the substrate 88, but if placed on the front of substrate 88 as shown in FIG. 3, a reflective and conductive coating must be electrically isolated from the electrode 20 to give the desired display effect. An alternate means of producing the desired reflection is to eliminate the coating 90 and compose the electrode 20 of a suitable reflective material. So doing, would achieve the same result as that illustrated.

Lyotropic nematic mesomorphic compositions which can be utilized with the present invention will include a solvent and a solute. The types of molecules which will form the required lyotropic mesophase are usually of an elongated, relatively straight and in some cases flattened structure. This shape favors the parallel arrangement of molecules characteristic of the nematic mesophase. In addition these compounds preferably are nematogenic at room temperature, for example in the range of from 15° C. to 30° C. Exemplary solutes are as follows:

a. butyl-p-(p-ethoxyphenoxycarbonyl) phenyl carbonate,

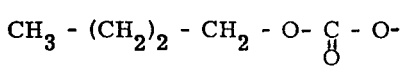

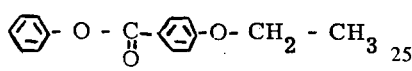

b. p-(p-ethoxyphenylazo)phenyl heptanoate,

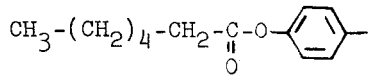

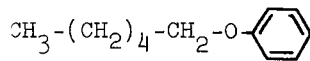

c. p-[N-(p-methoxybenzylidene)amino]phenyl acetate,

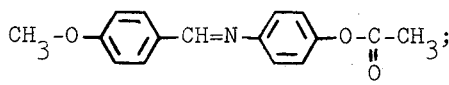

d. p-(p-ethoxyphenylazo)phenyl undecylenate,

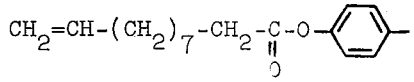

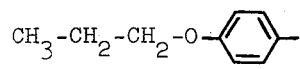

e. 4,4'-bis(heptyloxy)azoxybenzene,

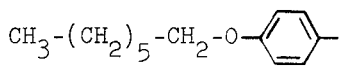

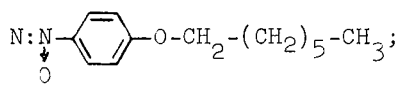

f. p-(p-ethoxyphenylazo)phenyl hexanoate,

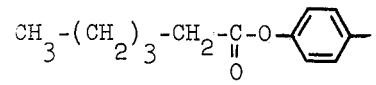

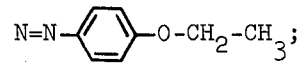

g. 4,4'-bis(pentyloxy)azoxybenzene,

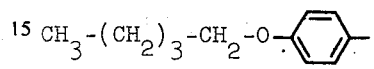

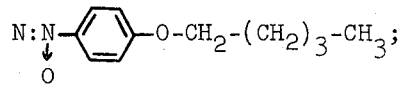

h. 4,4'-bis(hexyloxy)azoxybenzene,

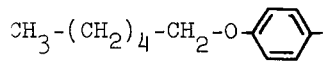

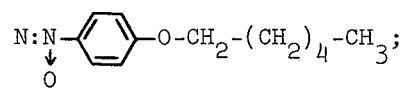

i. 4,4'-dibutoxyazoxybenzene,

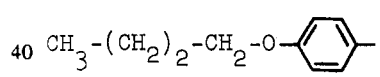

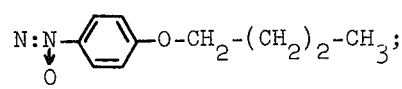

j. 4,4'-dipropoxyazoxybenzene,

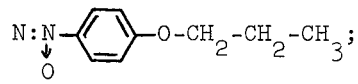

k. p-[N-(p-octyloxybenzylidene) amino]n-butyl benzene;

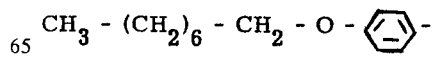

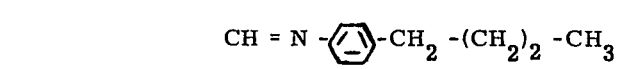

Other suitable solute molecules include:
4-[(p-hexyloxycarbonyloxybenzylidene)amino]-1-pentyloxybenzene,
N-[p-(pentyloxycarbonyloxy)benzylidene]-p-anisidine
p-[(p-butoxyphenyl)azo]phenyl butyl carbonate,
p-(p-ethoxyphenylazo)phenyl valerate,
p-[(p-ethoxybenzylidene)amino]phenyl acetate,
ethyl-p-[(p-methoxybenzylidene)amino]cinnamate,
ethyl-p-[(p-ethoxybenzylidene)amino]cinnamate,
p-[(p-methoxybenzylidene)amino]phenyl benzoate,
4,4'-azoxydianisole,
4,4'-azoxydiphenetole,
N-(p-methoxybenzylidene-p-phenylazoaniline,
4,4'-azodiphenetole,
p-methoxycinnamic acid,
N,N'-di(p-methoxybenzylidene)α,α'-bi-p-toluidine,
p-anisalazine,
4-acetoxy-3-methoxycinnamic acid.

Preferred solute molecules are those compounds (a) and (c) above, and more preferably a mixture of about eighty weight percent (a) and about twenty weight percent (c).

Suitable solvent molecules for use with the present invention can be of the general formula:

(L)   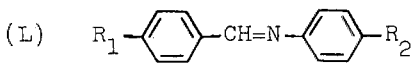

wherein $R_1$ and $R_2$ are alkyl radicals, the alkyl radicals having from one to five carbon atoms. Preferably the alkyl radicals have a straight chain or have a single methyl group branching therefrom. A preferred solvent is one wherein $R_1$ is methyl and wherein $R_2$ is n-butyl, i.e., m. p-[N-(p-methylbenzylidene) amino]n-butyl benzene,

Most preferably about sixty mole percent of the solvent (m) is mixed with forty mole percent of the aforementioned preferred mixture of (a) and (c) to yield to lyotropic nematic mesomorphic composition which exhibits the nematic mesophase within the temperature range as follows:

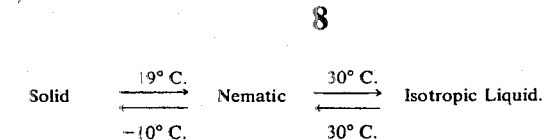

Other molecules exhibiting the long straight flattened structure and having a melting point preferably below room temperature can also be utilized within the purview of the present invention.

Various modifications of the foregoing description can be made without departing from the disclosed concept. It is intended that the invention only be limited by the definition of the appended claims.

What is claimed is:
1. A mixed liquid crystal composition consisting essentially of a mixture of
  a. a solvent having the general formula

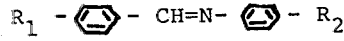

wherein $R_1$ and $R_2$ are alkyl radicals having from 1 to 5 carbon atoms; and
  b. a solute selected from at least one compound or a mixture of both compounds taken from the group of compounds consisting of
    1. butyl - p - (p-ethoxyphenoxycarbonyl) phenyl carbonate, and
    2. p - [N-(p-methoxybenzylidene) amino] phenyl acetate.
2. A mixed liquid crystal composition as set forth in claim 1, wherein said solute consists of a mixture of both said compounds.
3. A mixed liquid crystal composition consisting essentially of a mixture of
  a. a solvent consisting of p-[N- (p-methylbenzylidene) amino]n-butyl benzene; and
  b. a solute consisting of a mixture of:
    1. butyl - p - (p-ethoxyphenoxycarbonyl) phenyl carbonate, and
    2. p-[N-(p-methoxybenzylidene) amino] phenyl acetate.
4. A mixed liquid crystal composition as set forth in claim 3, wherein the mixture of said solute consists of about 80 weight percent of (1) and about 20 weight percent of (2).
5. A mixed liquid crystal composition as set forth in claim 4, wherein about 60 mole percent of said solvent is mixed with about 40 mole percent of the mixture of said solute.

* * * * *